United States Patent [19]

Son

[11] Patent Number: 4,873,720

[45] Date of Patent: Oct. 10, 1989

[54] AUTOMATIC DIALER

[75] Inventor: Masayoshi Son, Tokyo, Japan

[73] Assignee: Datanet Corp., Tokyo, Japan

[21] Appl. No.: 172,241

[22] Filed: Mar. 23, 1988

[51] Int. Cl.⁴ ............................................. H03M 1/27
[52] U.S. Cl. .................................... 379/356; 379/216; 379/221
[58] Field of Search ............... 379/355, 354, 356, 357, 379/358, 359, 216, 221

[56] References Cited

U.S. PATENT DOCUMENTS

| | | | |
|---|---|---|---|
| 4,645,879 | 2/1987 | Simmons | 379/355 |
| 4,731,826 | 3/1988 | Daie | 379/355 X |

Primary Examiner—James L. Dwyer
Attorney, Agent, or Firm—Finnegan, Henderson, Farabow, Garrett & Dunner

[57] ABSTRACT

An automatic dialer, which generates a signal for selection of a communication line from a plurality of communication lines belonging to a plurality of common carriers before communication is made between a calling subscriber and a called subscriber. The automatic dialer automatically transmits a signal specifying one of a plurality of signal paths coupled to the called subscriber in addition to other necessary signals, thus minimizing the numbers dialed by a user and resulting in easier operation of the system. The ones of the plurality of signal paths specified by the system can be easily changed by a tone sent to the system.

2 Claims, 10 Drawing Sheets

| APPLICATION NUMBER REGION | FLAG REGION I | FLAG REGION II | 14 RAM |
|---|---|---|---|
| 01 | 0 | 0 | |
| 02 | 0 | 1 | SELECTION INFORMATION REGION |
| 03 | 0 | 0 | |
| 06 | 1 | 1 | |
| 07 | 0 | 0 | |
| ⋮ | ⋮ | ⋮ | COMMON CARRIER INFORMATION REGION |
| 00 | 0 | 0 | |
| 010 | 0 | 0 | INDIVIDUAL INFORMATION REGION |
| 030 | 0 | 1 | |
| 060 | 0 | 0 | |
| 0450 | 0 | 0 | |

13 ROM

Fig.3

AUTOMATIC DIALER

BACKGROUND OF THE INVENTION

1. Field of the Invention

The present invention relates to an automatic dialer which generates a signal for selecting a communication line used by a plurality of common carriers.

2. Description of the Prior Art

FIG. 1 shows two signal paths for connecting a calling side telephone set 1 and a called side telephone set 90. In FIG. 1, reference numerals 2 and 200 designate telephone switchboards belonging to a first common carrier, which are coupled to two telephone sets 1 and 90. Reference numerals 3 and 300 designate telephone switchboards belonging to a second common carrier. A communication line 2C for connecting directly between the two telephone switchboards 2 and 200 belongs to the first common carrier and a communication line 2D for connecting directly between the other two telephone switchboards 3 and 300 belongs to the second common carrier. The other communication lines 2A, 2B, 2E, and 2F belong to the first common carrier. As shown in FIG. 1, a first signal path is composed of the communication line 2A, switch board 2, communication line 2C, switchboard 200 and communication line 2F and a second signal path is composed of the communication line 2A, switchboard 2, communication line 2B, switchboard 3, communication line 2D, switchboard 300, communication line 2E, switchboard 200 and communication line 2F.

The first signal path is a normal basic path. Therefore, when the first signal path is used, the communication from the calling side telephone set 1 to the called side telephone set 90 can be made only by means of dialing a toll number, a local office number, and a subscriber's number.

When above-described second signal path is used, the telephone set 1 should be operated so as to dial a plurality of predetermined numbers (or symbols, if required) and to further dial a toll number, a local office number, and a subscriber's number. The dialing of the predetermined numbers is necessary to select the second signal path. In an existing switchboard, the calling side telephone set 1 needs to be recognized by the second common carrier. The predetermined numbers and/or symbols include a carrier calling number (i.e., an identification number for specifying the second common carrier), a service request code, and a subscriber's information number.

Other telephone systems contain a device to automatically generate a signal for specifying one of such a plurality of signal paths. This device could be, for example, a "SYSTEM 4000 TELEFLEX" produced by COMMUNICATIONS SYSTEMS, INC.

Such a device is provided on a cable between the telephone set and the telephone switchboard. However, such a device is extremely troublesome in handling. More specifically, the device contains a memory storing a program corresponding to a signal path and individual information relating to the calling side telephone. Moreover, the device is required to store I.D. codes so as to transmit a signal corresponding to a telephone switchboard in an area where the device is located. Thus, this device is programmed by a personal computer through a modem, thereby operations of a plurality of dip switches of this device are needed.

Furthermore, if a user wishes to change toll numbers, that are handled by some common carriers, it is necessary to rewrite a corresponding program in the device by a personal computer through a modem.

SUMMARY OF THE INVENTION

It is, therefore, an object of the present invention to provide an automatic dialer that is capable of automatically transmitting predetermined signals for specifying one of a plurality of signal paths coupled to a called telephone set by dialing only a toll number, a local office number, and a subscriber's number.

Another object of the present invention is to provide an automatic dialer that can easily change the above-mentioned toll numbers handled by some common carriers.

A further object of the present invention is to provide an automatic dialer that can be connected to a telephone set through a cable.

A still further object of the present invention is to provide an automatic dialer that can be located at any of a plurality of areas.

In a preferred embodiment of the present invention, the automatic dialer coupled to the calling subscriber's telephone, the automatic dialer comprises first memory means for storing dialed information provided from the calling subscriber's telephone;

second memory means for storing predetermined additional information;

third memory means for storing specific information corresponding to a location where the called subscriber is positioned;

transmitting means for transmitting the predetermined additional information stored in the second memory means together with the dialed information stored in the first memory means to the telephone switchboard when the specific information stored in the third memory means coincides with a portion of the dialed information; and writing means for controlling a writing operation of the third memory means on the basis of a tone signal provided from an external system via a telephone switchboard assigned to a common carrier.

The transmitting means may comprise first means for setting the telephone on-hooking when a time-out signal is provided from the telephone switchboard prior to a compeletion of dialing operation, and after that, setting the telephone off-hooking; and second means for sending the additional information stored in the second memory means and the dialed information stored in the first memory to the telephone switchboard after on-hooking caused by the first means.

The above and other objects, effects, features, and advantages of the present invention will become more apparent from the following description of preferred embodiments thereof, taken in conjunction with the accompanying drawings.

BRIEF DESCRIPTION OF THE DRAWINGS

FIG. 3 is an explanatory diagram illustrating regions of a ROM and a RAM;

DETAILED DESCRIPTION OF PREFERRED EMBODIMENTS

Figure 1:
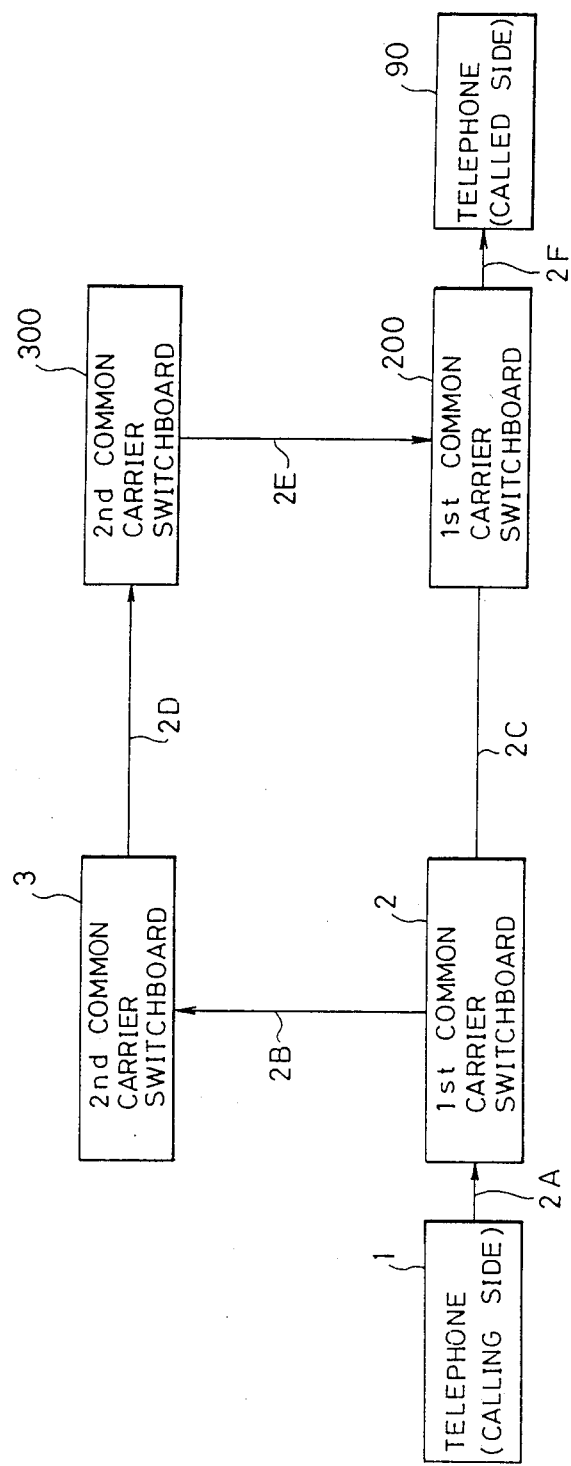
FIG. 1 is a block diagram showing a system having two signal paths between a calling side telephone set and a called side telephone set.
Figure 2:
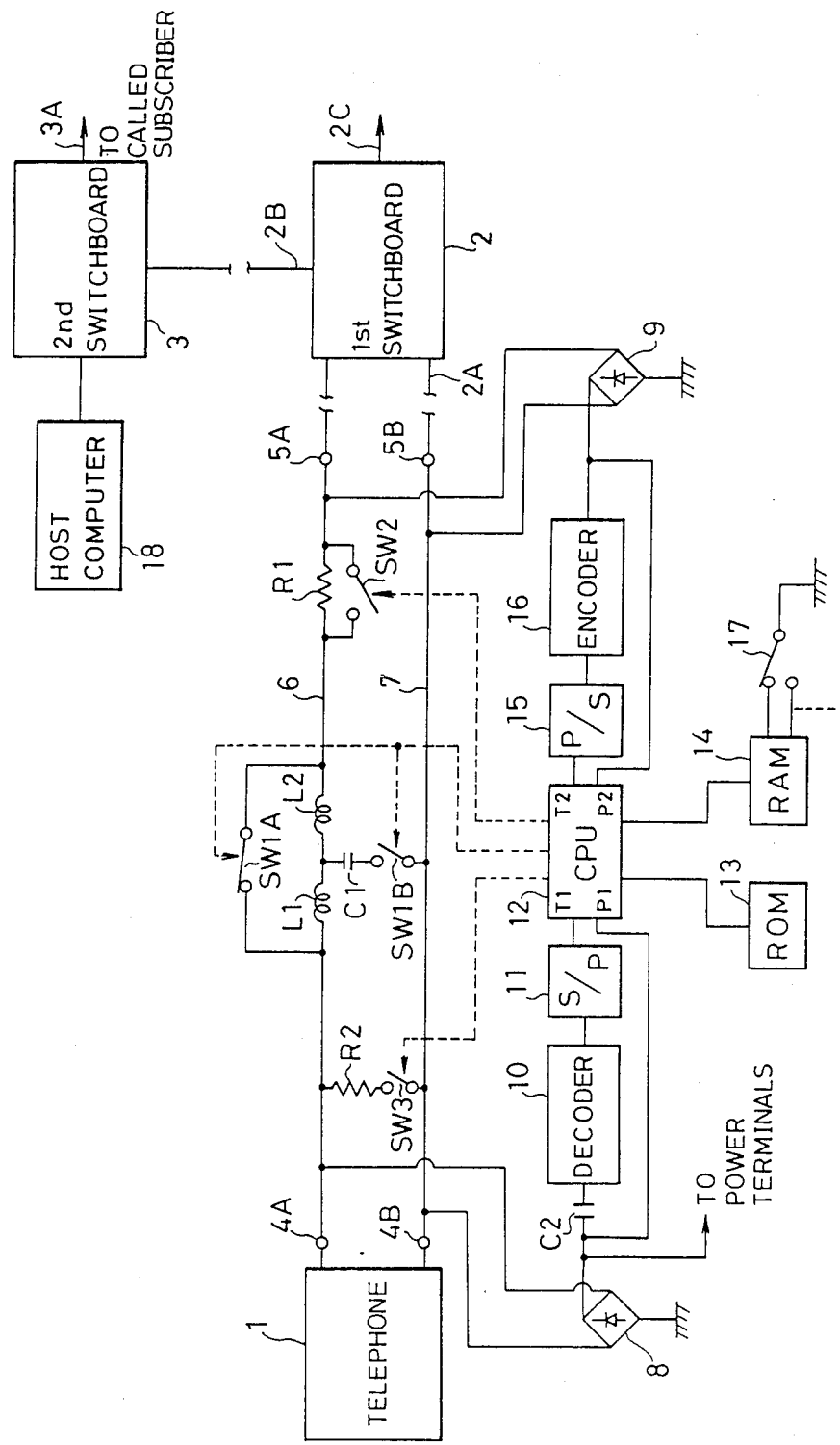
FIG. 2 is a block diagram showing an embodiment of an automatic dialer according to the present invention.

FIG. 2 is a block diagram showing an embodiment of an automatic dialing unit according to the present invention. In FIG. 2, telephone set 1 has a handset and further has a pushbutton or a dial. The telephone set 1 outputs a serial tone signal or a serial pulse signal as a selection signal for specifying a called subscriber. A first telephone switchboard 2 belongs to a first common carrier and second telephone switchboard 3 belongs to a second common carrier. The first and second telephone switchboards 2 and 3 are connected via a communication line 2B. A host computer 18 is coupled to the second telephone switchboard 3.

In an automatic dialer according to the present invention, terminals 4A and 4B provided at the telephone side are coupled to two signal lines from the telephone set 1, respectively, and terminals 5A and 5B provided at the switchboard side are coupled to communication lines 2A (two signal lines) from the first telephone switchboard 2 belonging to the first common carrier, respectively. These side terminals 4A and 4B, and 5A and 5B are respectively coupled through two signal lines 6 and 7. A T-type smoothing filter circuit comprising coils L1 and L2 and a capacitor C1 is provided on the signal lines 6 and 7. Two switches SW1A and SW1B are provided on the two signal lines 6 and 7 for the purposes of by-passing the T-type smoothing filter circuit.

A resistor R1 is mounted in the signal line 6. SW2 is a switch for, if required, bypassing the resistor R1. The resistor R1 stops supplying a signal from the telephone set 1 to the telephone switchboard 2 when the switch SW2 is opened. SW3 designates a switch for, if required, coupling a resistor R2 between the two signal lines 6 and 7. The resistor R2 has a resistance value substantially equal to the internal resistance of the telephone set 1 which is in the off-hook state.

A first bridge circuit 8 is composed of four diodes. The two intermediate terminals of the first bridge circuit 8 are coupled to the two signal lines 6 and 7 between the telephone side terminals 4A and 4B and the T-type smoothing filter circuit. The anode terminal of the first bridge circuit 8 is grounded. Therefore, irrespective of setting of the signal lines 6 and 7 or the states of the switches SW1A and SW1B, a plus dc voltage can be obtained at the cathode terminal of the first bridge circuit 8. When the switch SW1A is opened and the switch SW1B is closed, a signal component from the telephone set 1 can be obtained there at and, in response to closing of the switch SW1A and opening of the switch SW1B, signal components from the telephone set 1 and the telephone switchboard 2 side can be obtained the reat.

A second bridge circuit 9 comprises four diodes. The two intermediate terminals of the second bridge circuit 9 are coupled to the two signal lines 6 and 7 between the switchboard side terminal 5 and the T-type smoothing filter circuit. The anode terminal of the second bridge circuit 9 is grounded. A decoder 10, which is well known in the art, outputs a serial digital signal of a value corresponding to an inputted serial tone signal. The decoder 10 is operative if the telephone set 1 is a type of outputting a tone signal. More specifically, the decoder 10 converts a serial tone signal, supplied from the telephone set 1 through the bridge circuit 8 and a dc cutting capacitor C2 connected to the cathode terminal of the bridge circuit 8 thereto, into a serial digital signal. A serial/parallel (s/p) converter 11 converts the serial digital signal from the decode 10 into a parallel digital signal. A CPU 12 has an input terminal T1 for inputting a parallel digital signal from the S/P converter 211, an input terminal P1 for inputting a serial pulse signal, an output terminal T2 for outputting a parallel digital signal, and an output terminal P2 for outputting a serial pulse signal. In the case that the telephone set 1 is of the type outputting a pulse signal, a serial pulse signal from the telephone set 1 is inputted through the first bridge circuit 8 and the capacitor C2 to the input terminal P1.

Figure 5:
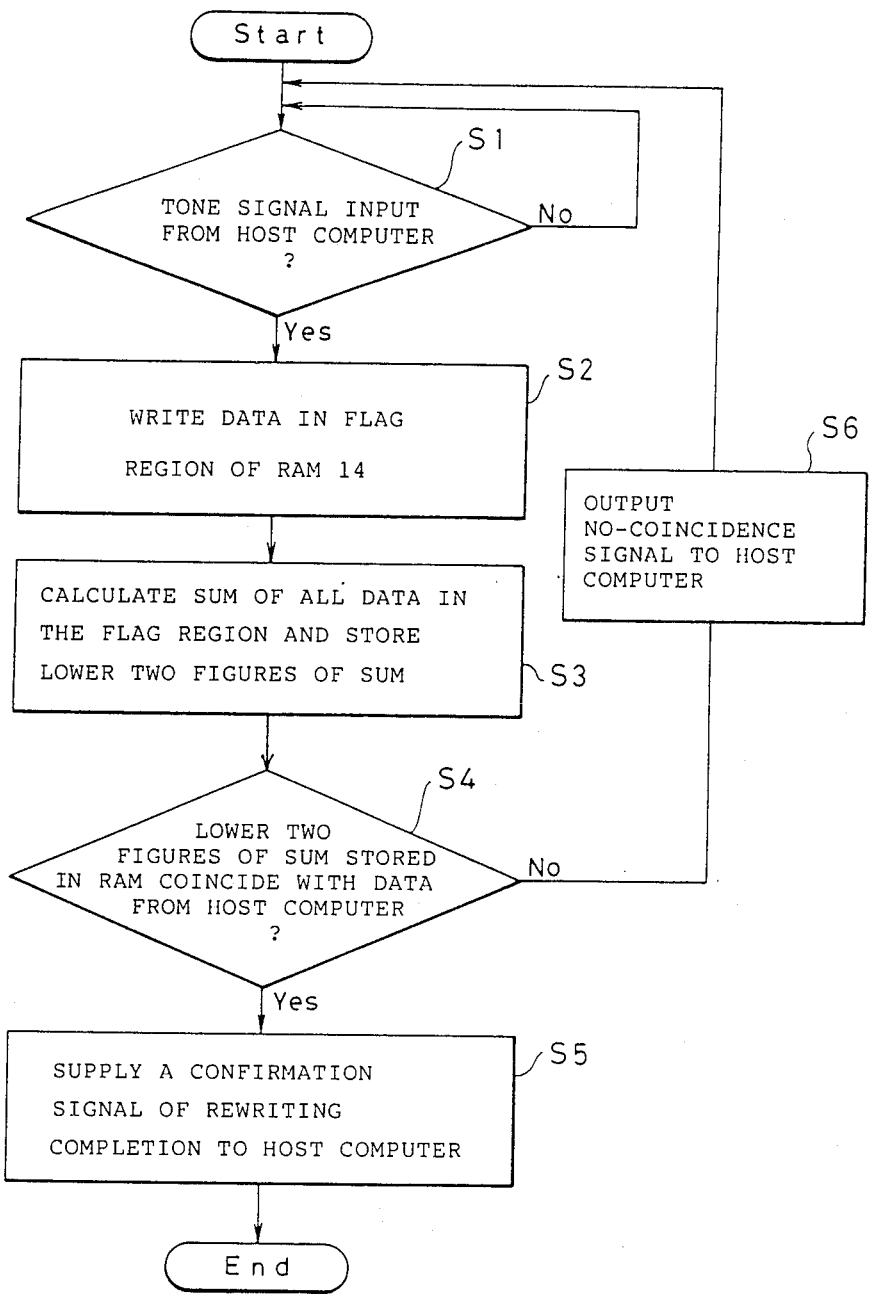
FIG. 5 is a flow chart illustrating operations of a CPU when writing data into the RAM of the automatic dialer according to the present invention.
Figure 6:
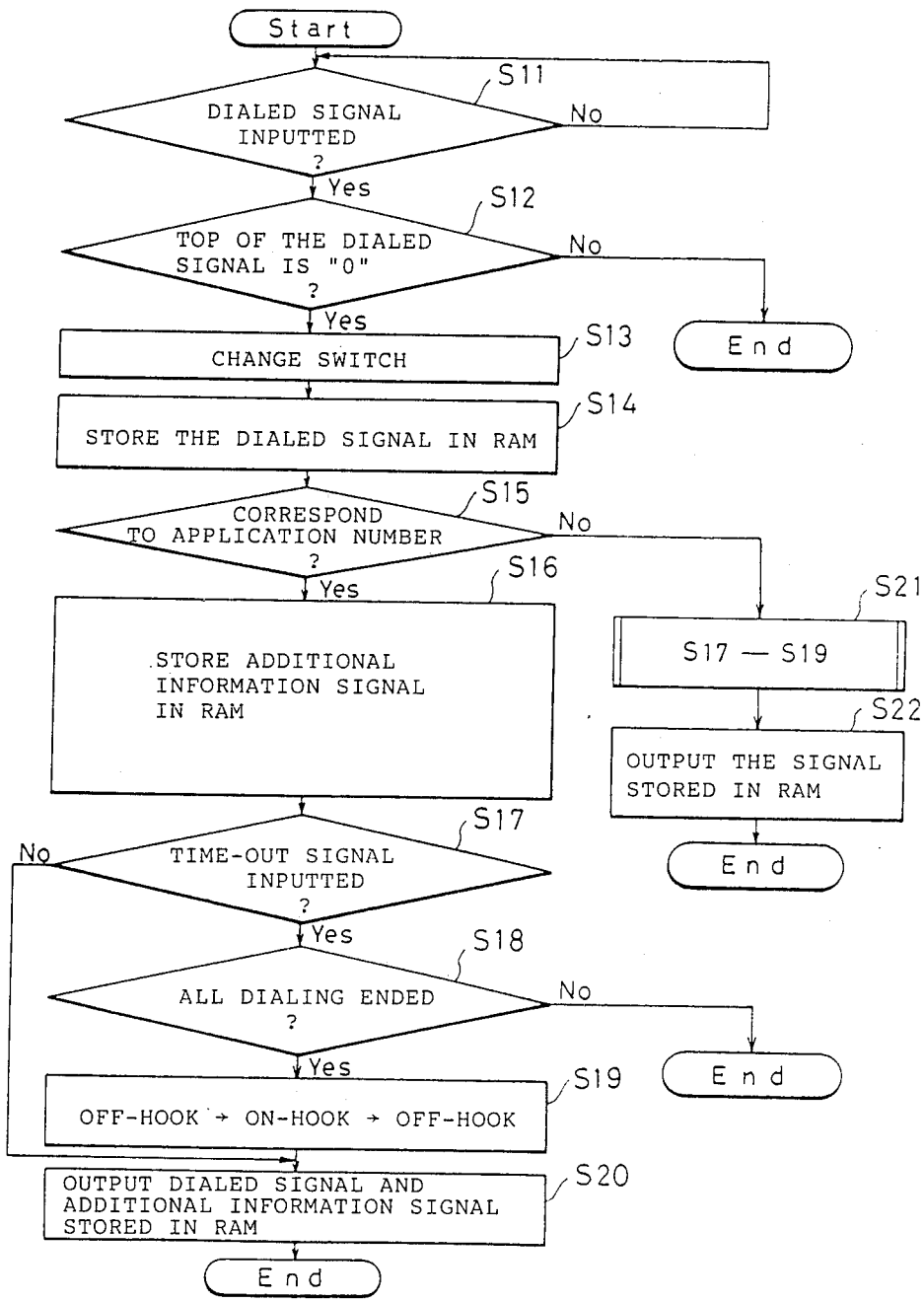
FIG. 6 is a flow chart illustrating operations of the CPU at the time of calling by the automatic dialer according to the present invention.

Read only memory (ROM) 13 has the following regions:

(1) control program region in which a control program of the CPU 12, shown in FIGS. 5 and 6, is stored; and (2) application number region in which a plurality of application numbers are stored. These application numbers comprise, for example, a toll number and a recognition number handled by the first common carrier and/or other predetermined common carrier, a ship telephone number, and a car telephone number.

A random access memory (RAM) 14 has a plurality of regions which will be described hereinafter. The data writing to the RAM 14 is performed in accordance with a tone signal inputted from the host computer 18 through the telephone switchboard 3, line 2B, and line 2A to the CPU 12.

The CPU 12 performs processes in response to an earlier one of the input signals to the two input terminals T1 and P1, prior to the execution of the control processes illustrated in FIGS. 5 and 6, when the handset of the telephone set 1 is off-hooked.

A parallel/serial (P/S) converter 15 converts a parallel digital signal from the output terminal T2 of the CPU 12 into a serial digital signal. An encoder 16, which is well known in the art, converts the serial digital signal from the P/S converter into a tone signal that is, in turn, supplied through the second bridge circuit 9, the two signal lines 6 and 7, and the communication line 2A to the first telephone switchboard 2.

The first telephone switchboard 2 causes a signal based upon a tone signal from the automatic dialer according to the present invention to be inputted to the second telephone switchboard 3 through the communication line 2B. The second telephone switchboard 3 causes a signal based upon the signal from the first telephone switchboard 2 to be supplied through a communication line 3A to a called subscriber. Similarly, the first telephone switchboard 2 causes a signal based upon the tone signal from the automatic dialer of this invention to be supplied through a communication line 2C to another called subscriber. When a serial pulse signal is outputted from the output terminal P2 of the CPU 12, the serial pulse signal is fed through the second bridge circuit 9, the two signal lines 6 and 7, and the communication line 2A to the first telephone switchboard 2. Thereafter, as in the case of the tone signal, the serial pulse is processed.

The CPU 12 controls the opening and closing of the switches SW1A, SW1B, SW2, and SW3. The switches SW1A and SW1B are associated operatively with each other so that one is closed when the other is opened. Furthermore, when the telephone set 1 is in the off-hook state and when either a switch 17, which will be described hereinafter, selects the first common carrier or "0" is not dialed initially, the CPU 12 causes the switch SW1A to be kept in the closed state, the switch SW1B to be kept in the open state, the switch SW2 to be kept in the closed state and the switch SW3 to be kept in the open state.

The first bridge circuit 8 can derive a dc voltage from its cathode side terminal, which is applied through the communication line 2A to the switchboard side terminals 5A and 5B. The dc voltage derived from the cathode side terminal of the first bridge circuit 8 is applied to power-supply terminals of the respective elements 10, 11, 12, 13, 14, 15, and 16. The resistor R1 inserted in the signal line 6 has a high resistance value (for example 1 MΩ) and allows a current large enough to at least back-up the RAM 14 when the switch SW2 provided in parallel with the resistor R1 is opened. Here, the RAM 14 may be connected to a back-up battery (not shown), if required.

When the telephone set 1 is in the off-hook state and the switch SW3 is open, the impedance between the two signal lines 6 and 7 is high (resulting in obtaining only extremely small current from between both the signal lines 6 and 7) so that the voltage is high (for example about 80 V) and the respective elements 10, 11, 12, 13, 14, 15, and 16 are in standby states (however, at least the RAM 14 is backed up). When the telephone set 1 is in the off-hook state, since the internal resistance of the telephone set 1 is loaded between the two signal lines 6 and 7, the impedance between the two signal lines 6 and 7 becomes low and, hence, a voltage for normal operation is applied through the first bridge circuit 8 to the respective elements 10, 11, 12, 13, 14, 15, and 16.

The RAM 14 receives selection information from the switch 17 for selecting one of the common carrier. The RAM 14 has the following regions:

(1) a selection information region storing selection information from the selection switch 17;

(2) a plurality of application flag regions storing information for determining a treatable above-mentioned application number (toll number etc.) for each common carrier other than the first common carrier (as illustrated by I and II in FIG. 3, for example);

(3) a common carrier information region storing carrier calling numbers (i.e., identification numbers) for each common carrier other than the first common carrier and service a request code;

(4) a temporary storing region temporarily storing a signal from the telephone set 1; and (5) an individual information region storing transmitter side information (for example, password and individual ID number) for specifying a subscriber that is under contract with each common carrier other than the first common carrier.

As shown in FIG. 3, the toll number and predetermined number treated by the first and/or other common carrier (two, three and four figures) are stored in above-mentioned application region in order from its top address. In the flag region I or II of the RAM 14 (corresponding to a predetermined common carrier selected by the selection switch 17), one bit of information (i.e., "1" or "0") is stored in order from the top address, so that each address corresponds to the address of the application number in the application number region of the ROM 13. When this flag information is "0", the corresponding application number stored in the ROM 13 is not handled by a common carrier. On the other hand, the flag information "1" represents the fact that the number is handled by a certain common carrier.

As illustrated in FIG. 2, the host computer 18 causes a tone signal to be inputted into CPU 12 through the telephone switchboard 3, communication line 2B, telephone switchboard 2, communication line 2A, and further through the signal lines 6 and 7, bridge circuit 8, capacitor C2, decoder 10, and S/P converter 11. The CPU 12, on the basis of the signal from the S/P converter 11, controls the respective switches and RAM 14 as will be described hereinafter. The tone signal has sixteen different frequencies that are outputted from the telephone set 1.

Figure 4:
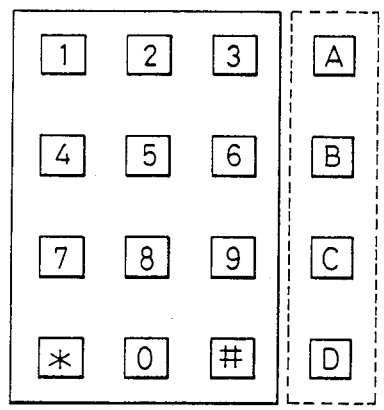
FIG. 4 is an explanatory diagram illustrating a transmittable signal from a tone signal type telephone set.

When the telephone set 1 is a type outputting a tone signal, the tone signal (a signal in audio frequency band) inputted from the telephone set 1 to the decoder 10 has twelve different tones (corresponding to the number of the dial buttons) as shown by portions surrounded by a solid line in FIG. 4. In addition, the decoder 10 can decode four different tones. These four tone signals are generated in the telephone set 1 (these signals are temporarily defined as A, B, C, D, as illustrated by portions surrounded by a dotted line in FIG. 4) and are transmittable via the communication lines.

Subsequently, a description will hereinbelow be made with reference to FIG. 5 in terms of operation of the CPU 12 on the data writing to the RAM 14.

When an operator of a predetermined common carrier other than the first common carrier (or the host computer or the like) calls the telephone set 1 of a subscriber to the common carrier, the telephone set 1 is changed from the on-hook state to the off-hook state by the subscriber. The telephone set 1 is coupled through the communication lines 2A and 2B and the telephone switchboards 2 and 3 to the common carrier. Since the off-hook causes the low-impedance internal resistance of the telephone set 1 to be loaded between the signal lines 6 and 7, the dc voltage between the signal lines 6 and 7 becomes low (for example, approximately 6 V) and is applied through the bridge circuit 8 to the respective elements 10 through 17 which, in turn, become in the operating states. Thereafter, in response to confirmation of this off-hook, the host computer 18 supplies a control signal to the CPU 12 whereby the switch SW3 is closed.

Thus, execution of the program illustrated in FIG. 5 is started. Once the program is started, the impedance between the signal lines 6 and 7 is kept low until the program is terminated even if the telephone set 1 is on-hooked thereafter. Furthermore the operator of the common carrier can inform a user of the telephone set 1 that the above-mentioned application numbers handled by the common carrier are to be written in the RAM 14. Thereafter, user can select the common carrier with operation of the selection switch 17 to set the telephone to the on-hook state (the impedance between the signal lines 6 and 7 is kept low as well as in the off-hook state). Thereafter, the host computer 18 supplies the tone signal which denotes the application members handled by the common carrier to the automatic dialer of the present invention.

Step S1

In step S1, the CPU 12 checks whether a tone signal for writing the application number is inputted from the host computer (as an external system) 18 during a predetermined time period from the start. For this control signal, a tone signal corresponding to, for example, "DDA" (see FIG. 4), which is not generated normally from the telephone set 1, is used.

Step S2

In response to inputting of such a signal, step S1 is followed by step S2 where data is written in the corresponding flag region of the RAM 14. More specifically, serial tone signals are inputted from the host computer 18 to the decoder 10, whose number corresponds to the addresses of the flag region (here, I) of the common carrier in the RAM 14. The decoder 10 converts the inputted tone signals into digital signals that are in turn supplied to the S/P converter 11. The S/P converter 11 converts the serial digital signals from the decoder 10 into four-bit parallel digital signals to be received by the CPU 12. The CPU 12, on the basis of the inputted four-bit digital signals, causes data to be written at every four addresses from the top address of the flag region I of the RAM 14. For example, if FIG. 3 shows the RAM 14 after writing, the toll number "06" in the ROM 13 is the number handled by the first common carrier because a corresponding bit in flag region I is set to "1". Thereafter, control advances to step S3.

Step S3

In step S3, the CPU 12 calculates the sum of the data "1" of all the addresses in the flag regions I of the RAM 14 and the calculated sum is stored in a temporary data storing region of the RAM 14. Similarly, in the host computer 18, the sum of data in the flag regions I is stored.

Step S4

In step S4, the CPU 12 checks whether the value of the lower two digits of the above-calculated sum stored in the RAM 14 is equal to the information of the lower two digits of the sum supplied from the host computer 18 through the decoder 10 and the S/P converter. If so, control goes to step S5.

Step S5

In step S5, a confirmation signal representing the reloading completion is supplied with a tone signal through the P/S converter 15 and encoder 16 to the host computer 18, and processing is complete.

Step S6

On the other hand, the test of step S4 is negative, step S6 follows to cause the CPU 12 to supply a signal indicating no coincidence through the S/P converter 15, encoder 16, and so on to the host computer 18 by means of a tone signal. Thereafter, the operational flow returns from step S6 to step S1. In the host computer 18, when the no coincidence signal is inputted from the automatic dialer, a tone signal is supplied to the automatic dialer in order to execute step S1. With the above-mentioned operation being repeated, when the no coincidence signal has received three times for example, it is assumed that the automatic dialer according to the present invention is malfunctioning.

The above-described operation of the CPU 12 on the data writing to the flag regions I operates similarly when rewriting (or changing) the contents of the flag regions 11. Moreover, writing data to the common carrier information region (see FIG. 3) and changing the contents in the same region is made by the CPU 12 on the basis of the tone signal inputted into the decoder 10. Also, writing data to the individual information region and changing the contents in the same region is made by the CPU 12 is similarly.

Next, operation of the CPU 12 on calling by the telephone set 1 will be hereinbelow described with reference to FIG. 6.

The CPU 12 is started to execute a program of FIG. 6 in response to the selection switch 17 selecting a certain common carrier other than the first common carrier and a dial tone signal being inputted from the telephone switchboard to the CPU 12 under the condition that the telephone set 1 is off-hooked. At this time, the switch SW1A is closed, SW1B is opened, SW2 is closed, and SW3 is opened.

Step S11

Initially, as shown in FIG. 6, in step S11, the CPU 12 determines whether a dialed signal (i.e., a toll number+a local office number+a subscriber's number) is inputted from the telephone set 1.

In step S11, "dialed signal" means "actually dialed signal by the operator". Thus, a carrier calling number is not included in the "dialed signal".

Step S12

In step S12, the CPU 12 determines whether the first number of above-mentioned dialed signal (dial number) is "0" and, if not, determines the call to be local, thereby resulting in termination of processing. In this case, the remainder of the selection signal is supplied through the signal lines 6 and 7 (the first number of the dial number has been already supplied in step S11).

If in step S12, the first number is 37 0", control proceeds to step S13.

Step S13

In step S13, the CPU 12 causes the switch SW1A to be switched from the closed state to the open state and further causes the switch SW1B to be switched from the open state to the closed state. Therefore, the direct signal output from the telephone set 1 to the first telephone switchboard 2 is prevented substantially after the first 37 0" is outputted.

Step S14

Subsequently, in step S14, the CPU 12 successively stores dialed signals corresponding to a dial number from the telephone set 1 to the RAM 14.

Step S15

In step S15, the CPU 12 searches the flag region (for example flag region I in FIG. 3) stored in the RAM 14 corresponding to a common carrier selected by the selection switch 17. The CPU 12 further determines whether the beginning portion of the dialed number inputted from the telephone set 1 coincides with the application number stored in the application number region of the ROM 13, corresponding to the address of the flag region in which "1" is stored. If the determines is true (for example, if the top portion of the dialed number is "06"), control goes to step S16. On the other hand, if not, control advances to step S21.

Step S16

In step S16, a carrier calling number (i.e., a identification number relating to a common carrier that is stored in the common carrier information region) and a service request code are added prior to the dialed number. The calling subscriber's information, which is stored in the individual information region (see FIG. 3), is also added. For example, eight figures, the first four figures are for the ID number inherent to the subscriber and the second four figures are for the recitation number inherent thereto.

Step S17

In step S17, the CPU 12 determines whether a time-out signal (for example, an intermittent signal with a frequency of 4000 Hz) is inputted from the side of telephone switchboard and, if not, control goes to step S20. On the other hand, if so, control goes to step S18.

Step S18

In step S18, the CPU 12 decides whether the overall dialing operation is completed or not. This decision is made by counting the times the dialing operation is performed and determining whether the count is equal to the sum of the toll number (depending on the area of called subscriber), local office number, and subscriber's number. When 20 seconds elapse between successive dialing operations, the dialing operation is deemed incomplete and step S18 is followed by step S19. On the other hand, in response to no completion thereof, the operational flow goes to the end (for example, the switches SW1A and SW1B return respectively to their original states, resulting in return to the start).

Step S19

In step S19, the CPU 12 causes the switch SW2 in the closed state to be opened (that is, when viewed from the side of the telephone switchboard, as a result, the telephone set 1 is set to the on-hook state) and then causes the switch SW2 to be closed (that is, when viewed from the side of the switchboard, as a result, the telephone set 1 is set to the off-hook state), thereby resulting in a retransmittable state.

Step S20

In step S20, the CPU 12 supplies signals stored in the RAM 14, i.e., carrier calling number, a service request code, a calling subscriber's information and a dialed number, to the switchboard side.

Figure 7:
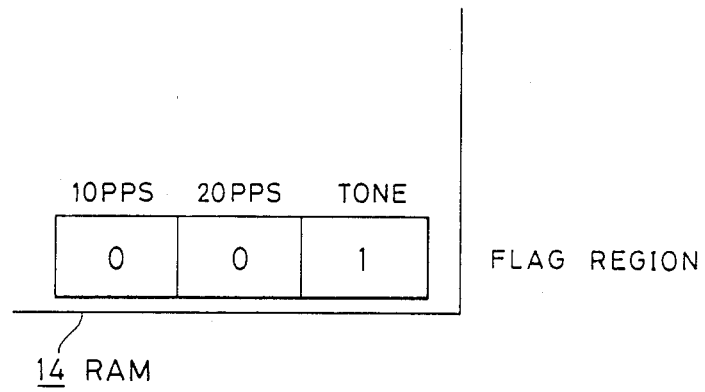
FIG. 7 is an explanatory diagram illustrating regions in a modification of the RAM.

FIG. 7 shows a portion of a modification of the RAM 14 used in an embodiment of an automatic dialer of the present invention. The other arrangement of the RAM 14 is similar as shown in FIG. 2.

As shown in FIG. 7, the RAM 14 has a flag region comprising three flags for three different dialed signals. A "1" is stored corresponding to any one of the three kinds of dialed signals, i.e., 10 pps (pulses per second) and 20 pps pulse signals and a tone signal. This storing process is performed at the time of initialization of the RAM 14 based on a tone signal from the host computer 18. That is, with respect to the dial type telephone set 1, determination of one of the 10 pps and 20 pps is naturally made in accordance with the telephone switchboard 2 of the first common carrier coupled to the telephone set 1. Therefore when the initializing tone signal is inputted from the host computer 18 through the switchboards 2, 3, and so on to the CPU 12, a "1" value can be stored in the corresponding flag region of the RAM 14 illustrated in FIG. 7. In FIG. 7, since a "1" value is stored in a portion for a tone signal, after the initialization of the RAM 14 and prior to execution of processes of FIG. 6, the CPU 12 can easily process the dialed signals (tone signals) from the telephone set 1 only by referring the flag region and can perform calling by means of the tone signals.

In another preferred embodiment, the RAM 14 can be exclusive for the respective common carriers other than the first common carrier. That is, the RAM 14 can be used exclusively for one of the other common carriers, the selection switch 17 can be omitted, and the plurality of flag regions can be replaced by a single flag region.

FIGS. 8 through 13 show detailed automatic dialer arrangements according to the present invention.

Figure 8:
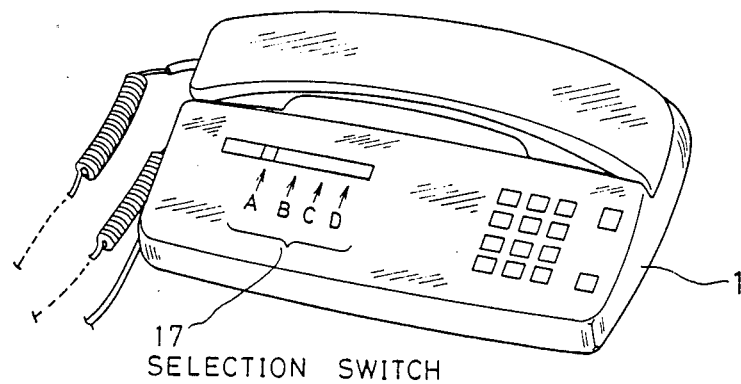
FIG. 8 is a perspective view showing a preferred embodiment of the present invention.

FIG. 8 shows an arrangement in which an automatic dialer according to the present invention is built into a case of a telephone set 1. A selection switch 17 is located next to pushbuttons of the telephone set 1.

Figure 9:
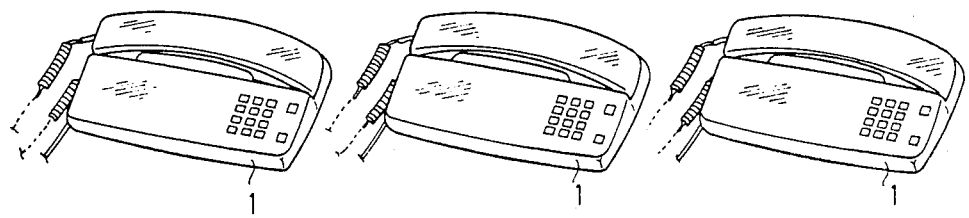
FIG. 9 is a perspective view showing another preferred embodiment of the present invention.

FIG. 9 illustrates a plurality of telephone sets 1 in which automatic dialers dialing only for the second and third common carriers, respectively, are mounted. However, the telephone set 1 for the first common carrier does not contain the automatic dialer according to the present invention.

Figure 10:
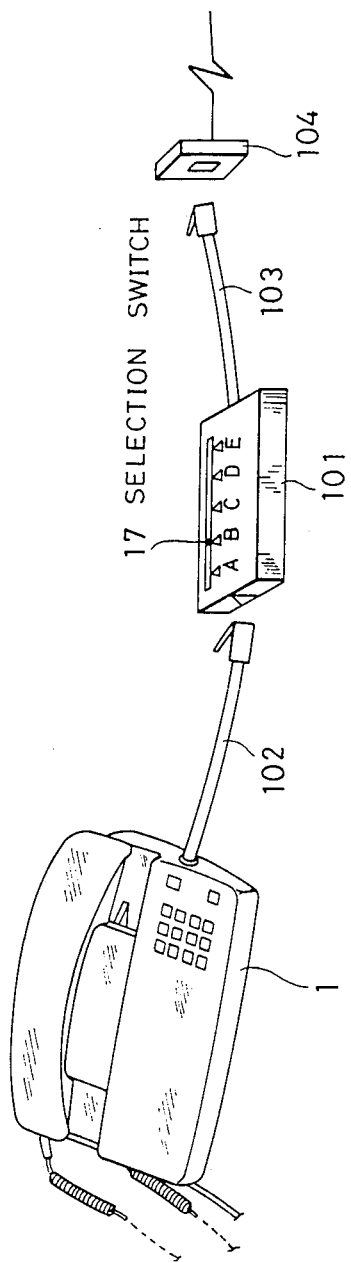
FIG. 10 is a perspective view showing a further preferred embodiment of the present invention.

FIG. 10 illustrates an adapter type automatic dialer 101 according to the present invention. A telephone set 1 and the automatic dialer 101 are coupled through a cable 102 and the automatic dialer 101 and a plug socket 104 of the switchboard side are coupled through another cable 103.

Figure 11:
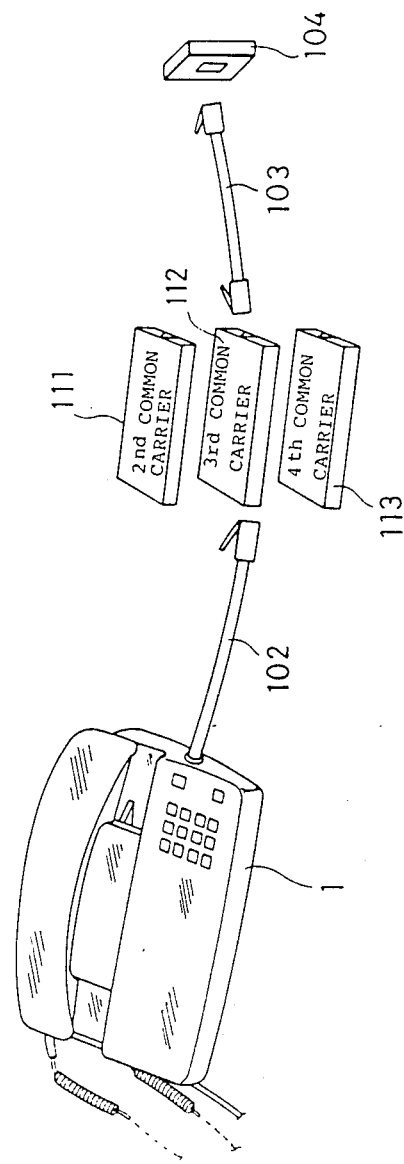
FIG. 11 is a perspective view showing a further preferred embodiment of the present invention.

FIG. 11 shows automatic dialers 111, 112, and 113 for the respective common carrier according to the present invention. The cables 102 and 103 are coupled to one of these automatic dialers.

Figure 12:
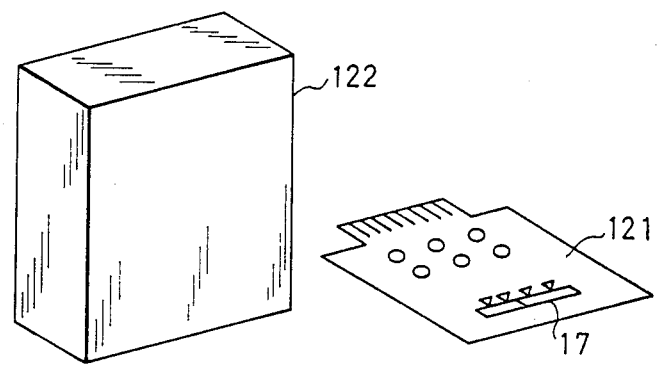
FIG. 12 is a perspective view showing a further preferred embodiment of the present invention.

FIG. 12 is an illustration of an automatic dialer 121 according to the present invention. The automatic dialer is provided on a circuit board, which is built in a private telephone switchboard 122.

Figure 13:
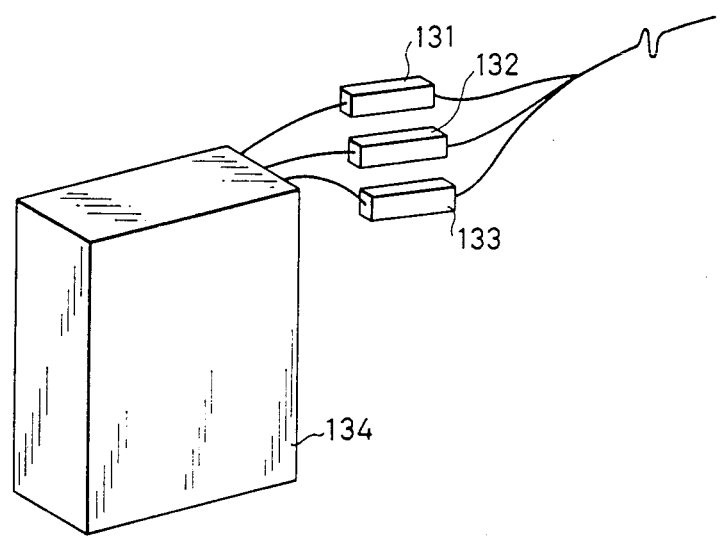
FIG. 13 is a perspective view showing a still further preferred embodiment of an application of the present invention.

FIG. 13 shows automatic dialers 131, 132, and 133 according to the present invention, which are provided from the respective common carriers. These automatic dialers are provided between a private telephone switchboard 134 and a telephone switchboard of the first common carrier.

As described above, according to the present invention, a necessary signal can be automatically transmitted with the minimum dial operation.

Furthermore, according to the present invention, the initialization of the RAM, rewriting of data, and so on can be performed according to a tone signal carried through communication lines and telephone switch- Other embodiments will be apparent to those skilled in the art from consideration of the specification and practice of the invention disclosed herein. It is intended that the specification and examples be considered as exemplary only, with a true scope of the invention being indicated by the following claims.

What is claimed is:

1. An automatic dialer for sending a calling signal from a calling subscriber telephone to a called subscriber telephone via a telephone switchboard and one of a plurality of common carriers, said automatic dialer coupled to said calling subscriber telephone, said automatic dialer comprising:
   first memory means for storing dialed information provided from said calling subscriber telephone;
   second memory means for storing predetermined additional information corresponding to each of the plurality of common carriers;
   third memory means for storing specific discriminating information corresponding to a portion of said dialed information stored in said first memory means, said discriminating information corresponding to ones of said plurality of common carriers;
   read means for reading out a portion of said dialed information from said first memory means;
   access means for reading out said specific discriminating information stored in said third memory means, in response to the portion of said dialed information read by said read means;
   transmitting means for transmitting said predetermined additional information stored in said second memory means together with said dialed information stored in said first memory means to said telephone switchboard when said specific discriminating information stored in said third memory means is accessed; and
   writing means for controlling a writing operation of said third memory means on the basis of a tone signal provided from an external system via a telephone switchboard assigned to a common carrier.

2. The automatic dialer as claimed in claim 1, said transmitting means comprising:
   first means for setting said telephone on-hook and then setting said telephone off-hook when a time-out signal is provided from said telephone switchboard prior to a completion of a dialing operation; and
   second means for sending said additional information stored in said second memory means and said dialed information stored in said first memory means to said telephone switchboard after on-hooking caused by said first means.

* * * * *